United States Patent
Chadha et al.

(10) Patent No.: US 11,238,314 B2
(45) Date of Patent: Feb. 1, 2022

(54) IMAGE AUGMENTATION AND OBJECT DETECTION

(71) Applicant: salesforce.com, inc., San Francisco, CA (US)

(72) Inventors: Ankit Chadha, Palo Alto, CA (US); Caiming Xiong, Palo Alto, CA (US); Ran Xu, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 131 days.

(21) Appl. No.: 16/686,051

(22) Filed: Nov. 15, 2019

(65) Prior Publication Data
US 2021/0150282 A1  May 20, 2021

(51) Int. Cl.
| | |
|---|---|
| *G06K 9/62* | (2006.01) |
| *G06T 3/40* | (2006.01) |
| *G06T 3/60* | (2006.01) |
| *G06N 3/04* | (2006.01) |
| *G06N 3/08* | (2006.01) |
| *G06T 3/20* | (2006.01) |

(52) U.S. Cl.
CPC ......... *G06K 9/6262* (2013.01); *G06K 9/6257* (2013.01); *G06N 3/04* (2013.01); *G06N 3/08* (2013.01); *G06T 3/20* (2013.01); *G06T 3/40* (2013.01); *G06T 3/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,332,245 | B1* | 6/2019 | Price | G06T 7/0002 |
| 10,467,473 | B1* | 11/2019 | Adler | G06N 3/0454 |
| 2015/0055829 | A1* | 2/2015 | Liang | G06K 9/00536 382/103 |
| 2018/0232663 | A1* | 8/2018 | Ross | G06N 3/105 |
| 2019/0025858 | A1* | 1/2019 | Bar-Nahum | B64D 47/08 |
| 2019/0208181 | A1* | 7/2019 | Rowell | H04N 5/23267 |
| 2019/0258878 | A1* | 8/2019 | Koivisto | G05D 1/00 |
| 2020/0184623 | A1* | 6/2020 | Price | G06N 3/0454 |

* cited by examiner

*Primary Examiner* — Zhiyu Lu
(74) *Attorney, Agent, or Firm* — Holland & Hart LLP

(57) ABSTRACT

Computing systems may support image classification and image detection services, and these services may utilize object detection/image classification machine learning models. The described techniques provide for normalization of confidence scores corresponding to manipulated target images and for non-max suppression within the range of confidence scores for manipulated images. In one example, the techniques provide for generating different scales of a test image, and the system performs normalization of confidence scores corresponding to each scaled image and non-max suppression per scaled image These techniques may be used to provide more accurate image detection (e.g., object detection and/or image classification) and may be used with models that are not trained on modified image sets. The model may be trained on a standard (e.g. non-manipulated) image set but used with manipulated target images and the described techniques to provide accurate object detection.

20 Claims, 10 Drawing Sheets

IMAGE AUGMENTATION AND OBJECT DETECTION

FIELD OF TECHNOLOGY

The present disclosure relates generally to image processing, and more specifically to image augmentation and object detection.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a cloud platform supports an object detection or image classification service. The services may utilize various types of machine learning models to detect objects and/or classify images. In some cases, the services may classify images and/or detect objects based on confidence scores assigned by the machine learning model. Some object detection/image classification techniques may not identify certain objects or miss-classify images based on the assigned confidence scores.

DETAILED DESCRIPTION

Figure 1:
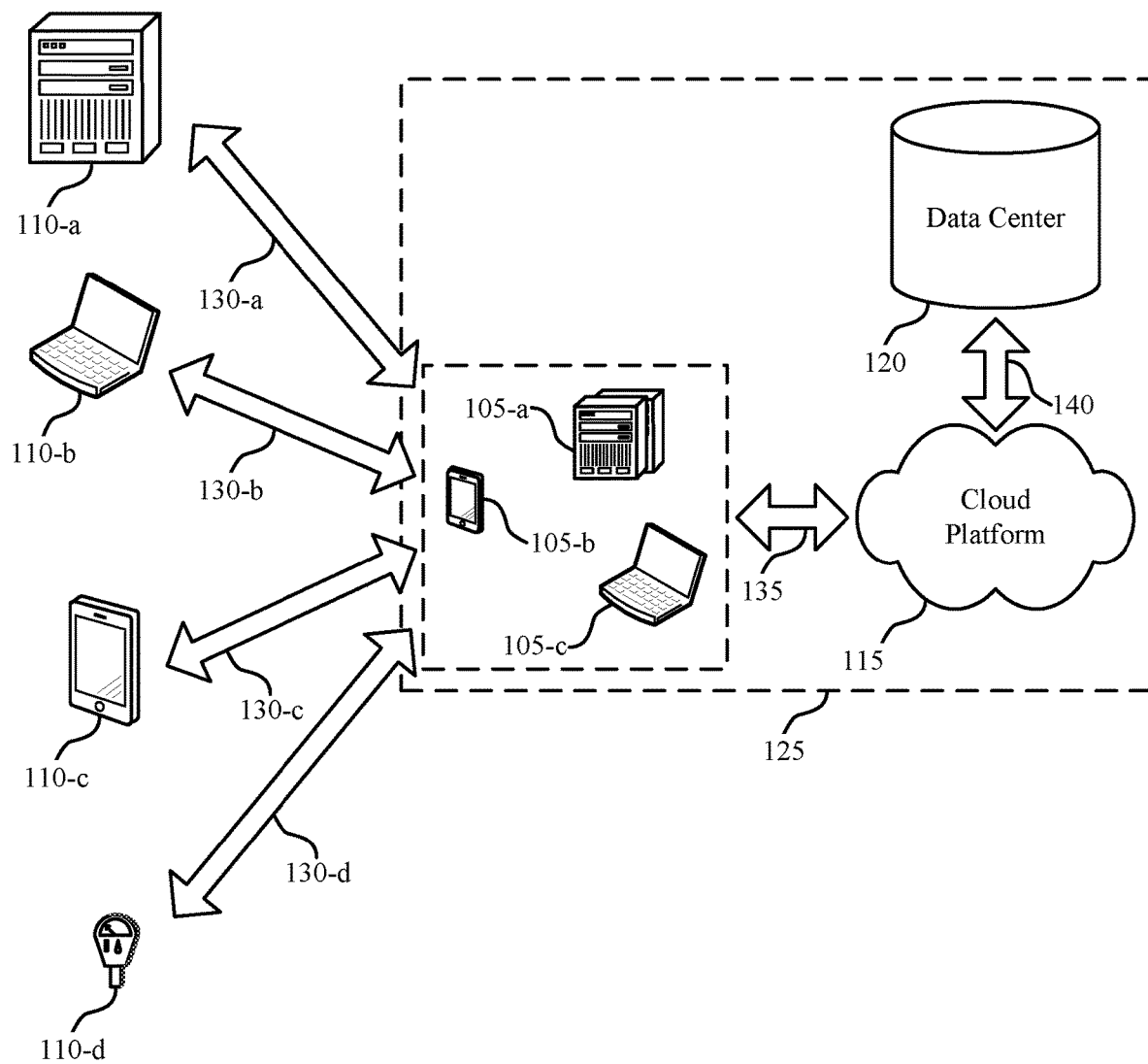
FIG. 1 illustrates an example of a system for image processing that supports image augmentation and object detection in accordance with aspects of the present disclosure.

Computing systems may support image classification and image detection services, and these services may utilize object detection/image classification machine learning models. Image recognition/classification models may perform image augmentation techniques for better model training and image recognition/classification. For example, a test time augmentation technique may manipulate test images for a better trained image recognition model. Image manipulation techniques may include zooming, flipping, shifting, scaling, etc. Thus, a model may be trained using various versions of images from a limited set of training images. Further, when the trained model is being used for classifying/detecting a target image, the target image may be manipulated to provide a greater chance of success. Generated confidence scores associated with the various manipulations of the augmented image may be averaged to obtain a final score for the image or for identified objects within the image. In some cases, before the scores are averaged, bounding boxes or objects may be filtered from consideration based on the confidence scores. For example, confidence scores below a certain threshold may be removed from consideration, which may result in various objects not being identified. Further, training an image classification model using multiple augmented versions of the same image may require significant processing resources.

The described techniques provide for normalization of confidence scores corresponding to manipulated target images and for non-max suppression within the range of confidence scores for manipulated images. These techniques may be used to provide more accurate image detection (e.g., object detection and image classification) and may be used with models that are not trained on augmented image sets. The model may be trained on a standard (e.g. non-manipulated) image set, but used with manipulated target images and the described techniques to provide accurate object detection.

In some cases, the model (e.g., an object detection machine learning model such as a neural network) described herein may be trained using the normalization and non-max suppression techniques. Accordingly, a set of training images may be manipulated and used to train the model such that the model is better equipped to detect or classify images and/or detect objects within images. In some cases, various input images may comprise images of documents. Thus, a user may utilize a client system to generate an image of a document, and the techniques described may be used to detect characters and/or tables within an image (e.g., optical character recognition (OCR)). Further, the detected objects (e.g., characters, tables) may be input into a document, which may be hosted by an online document hosting service.

Aspects of the disclosure are initially described in the context of an environment supporting an on-demand database service. Aspects of the disclosure are further described with respect to an object detection processing diagram, which shows a processing timeline of aspects of object detection, and a system for image processing. Aspects of the disclosure are further illustrated by and described with reference to apparatus diagrams, system diagrams, and flowcharts that relate to image augmentation and object detection.

FIG. 1 illustrates an example of a system 100 for cloud computing that supports image augmentation and object detection in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support an image detection service (e.g. object detection and/or image classification service). The image detection service may be used by various cloud clients 105 and/or contacts 110. For example, a cloud client 105 may offer the image detections service to various contacts 110 (e.g. customers). In some cases, the image detection service may support OCR. For example, a contact 110 may upload an image of a document to the image detection service supported by the cloud platform 115. The image detection service may detect text, tables, etc. (collectively "objects") from the image of the document and upload the detected objects in a document of a document service supported by the cloud platform 115.

In some cases, an image detection process may utilize test time augmentation techniques, in which a test image may be manipulated to provide a better chance of detecting an object or classifying the image. For example, a test image may be manipulated such as to output different scaled test images. The test image and the scaled test images may be input in the image detection model, various confidence scores may be assigned to objects/images, the confidence scores may be filtered, and remaining confidence scores may correspond to detected objects or classified images. However, these techniques may discard various confident predictions because the filtering methods may not account for variations of sampled predictions at different scales (or other image manipulations). As such, the model may fail to identify some objects or misclassify an image.

To solve these problems, the image detection service supported by the cloud platform 115 may provide techniques that may be used to support a more accurate object detection image classification. In some cases, the image detection service supported by the cloud platform 115 may normalize a set of confidence scores corresponding to a manipulated test image based on the confidence scores for the test image (e.g. unmanipulated image). For example, an input image may be manipulated to produce one or more scaled (e.g., a reduced scale and an increased scale) test images. The input images and the test images may be input into an object detection neural network (or some other object detection machine learning model), which may detect objects and assign confidence scores to each detected object. As such, a range of confidence scores may be associated with each image (e.g., the test image and the test image manipulations). The range of confidence scores associated with the test image manipulations may be normalized based on the range of confidence scores associated with the test image (e.g., unmanipulated image). Accordingly, when the confidence scores are compared to a threshold, the normalized scores may provide a more accurate test against the threshold. That is, confidence distribution may be different at various scales (e.g., and other manipulations). As such, normalizing the distribution may provide for more accurate object detection.

Further, the image detection service supported by the cloud platform 115 may support non-max suppression per range of confidence scores associated with each test image (e.g., test image and test image manipulation). Thus, when multiple objects are detected within overlapping bounding boxes (e.g., an area defining a detected object), the system may support selection of the highest confidence score of the overlapping bounding boxes for each range of confidence scores (e.g., the confidence scores corresponding to the test image and the manipulated test image). For example, when the image manipulations include generating various different scales of an input image, the cloud platform 115 may support non-mass suppression per scale, including the unscaled image and the various scaled images. Thus, rather than testing each overlapping bounding box confidence for every image, the lower confidence predictions for each range may be filtered.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, a cloud client 105 may utilize the image detection service for document intake. A contact 110 may access the service using a personal device such as a laptop computer. The contact 110 may input a document (e.g., a contract) into the service, the service (or an associated service) may take an image of the document, and the image may be input into the image detection system. The image detection system generates two modified versions of the document (e.g., a version scaled by 50% and scaled by 100%). The two scaled versions and the original version are input into the machine learning model which detects objects such as text or tables and assigns confidence scores for each detected object. If objects are associated with overlapping bounding boxes (within each scale), then the system selects the highest score for a set of overlapping bounding boxes. Further, the range of confidence scores associated with each scaled image are normalized based on the range of the unscaled image. Each score may then be compared to a threshold and passing scores may be associated with objects that are identified as detected objects from the original input image.

Figure 2:
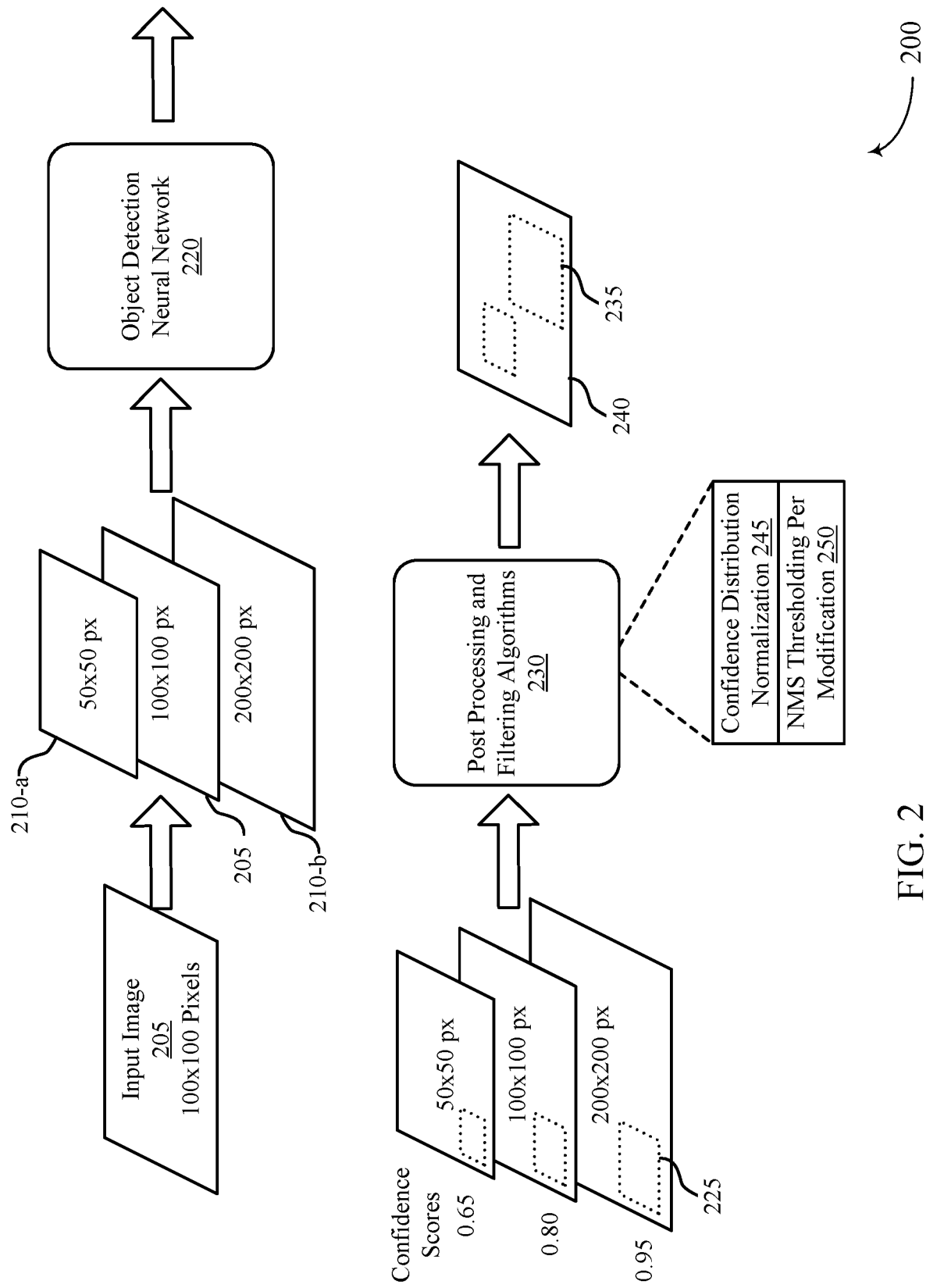
FIG. 2 illustrates an example of an object detection system that supports image augmentation and object detection in accordance with aspects of the present disclosure.

FIG. 2 illustrates an example of an object detection processing diagram 200 that supports image augmentation and object detection in accordance with aspects of the present disclosure. The object detection processing diagram illustrates how a system receives an input image 205, which may be referred to as a test image. In FIG. 2, the input image 205 is 100×100 pixels as an example, but it should be understood that various sizes may be used.

The system supports manipulation of the input image to produce at least one modified input image 210. As illustrated, the system manipulates the input image 205 to generate a first scaled image 210-a and a second scaled image 210-b. The first scaled image 210-a is a 50×50 pixel version of the input image 205, and the second scaled image 210-b is a 200×200 pixel version of the input image 205. Other image manipulations may be performed by the system 200 in addition to or instead of scaling. For example, the system may flip images, stretch or squeeze images, add noise to image data, brighten or darken the input image 205, transform a perspective of the input image 205, or a combination of these and other image manipulation techniques.

The input image 205 and the modified input images 210 may be processed by an object detection machine learning model. In FIG. 2, the machine learning model is an object detection neural network 220, but other types of machine learning (e.g., deep learning) models may be used. The object detection neural network 220 may perform various processes such as object recognition, image classification, object localization, object segmentation, etc. for each of the input image 205 and the modified input images 210.

The object detection neural network 220 may identify sets of objects (e.g., an object identified by a bounding box 225) for each processed image and confidence scores associated with the identified objects. That is, the object detection neural network 220 may identify a range (e.g., distribution) of confidence scores for each processed image, where each confidence score corresponds to an identified object from one of the processed images. Certain post processing and filtering algorithms 230 may perform certain procedures to output detected objects. For example, the post processing and filtering algorithms 230 may resize bounding boxes to original scale and filter confidence scores and associated objects.

According to aspects described herein, post processing and filtering may include confidence distribution normalization 245 and non-max suppression (NMS) thresholding per modification 250. According to confidence distribution normalization 245, the system may normalize the confidence distributions for each of the range of confidence scores corresponding to the modified input images 210 based on the range of confidence scores for the input image 205. In one example normalization technique, the system may perform confidence score mean centering. According to the confidence score mean centering technique, the system may identify a mean of the range of confidence scores for the input image 205 and a mean corresponding to each range of confidence scores for the modified input images 210. The system may then identify a difference between the mean for the range of confidence scores for the input image 205 and the mean for the range of confidence scores for the modified input images 210. That is, the system calculates or otherwise determines a difference for the mean of the range of confidence scores for the modified input image 210-a and for the mean of the range of confidence scores for the modified input image 210-b. Based on the respective differences, the system may adjust the range of confidence scores for the modified input images. Accordingly, each confidence score in a range of confidence scores corresponding to the modified input image 210-a is adjusted by its mean difference, and each confidence score of the range of confidence scores corresponding to the modified input image 210-b is adjusted by its mean difference.

The mean centering technique may be represented by the following formulas:
Let $C_i$ be the confidence distribution of the input image.
$C_S$ is the confidence distribution for one of the scaled images (e.g., modified input image 210-a or 210-b), where S can be any scale from a sets $s \in \{S_1, S_2, \ldots, S_n\}$.
For each $C_S$: the difference between the means of $C_S$ and $C_i$ is calculated:

$$d = \mu_i - \mu_S$$

Each confidence value (p) in $C_S$ is subsequently shifted by d. This results in centering the mean of $C_S$ with $C_i$ Another confidence distribution normalization technique includes modifying the range distribution corresponding to the modified input images 210 to correspond to the range for the input image 205. For example, if the difference between the lowest confidence score (or a low end confidence score at or above some threshold) and the highest (or a high end confidence score at or above some threshold) for the modified input image 210-a is x, and the difference for the low-end and high-end confidence score of the input image is y, then the range for the modified input image 210-a may be adjusted such that x=y. That is, the distributions are adjusted such that the differences are correlated. This and other techniques may be used alone or in combination. For example, the range may be adjusted such that the differences are the same, then the means are shifted as described above.

The normalization techniques solves problems where a confidence object detection prediction made by the system at different scales (or other image manipulations) may get discarded because of the filtering methods (e.g., based on comparison of a confidence score to a confidence score threshold) do not account for the variation of sampled predictions for different images manipulations/scales. As such, normalization of the confidence scores may provide more accurate object detection.

According to NMS thresholding per modification 250, the system may identify objects corresponding to overlapping bounding boxes per modified input image 210 and select the highest score from the overlapping boxes for consideration. This technique may be performed prior to resizing images/bounding boxes to the original scale (or changing other parameters of the modified input images 210 to correspond to the input image 205, such as removing transformations, removing brightness modifications, etc.). The object detection neural network 220 may identify bounding boxes that outline detected objects. In some cases, the object detection neural network 220 may identify bounding boxes that correspond to the same object in an image, and as such, may overlap to some degree. Further, each bounding box may have a corresponding confidence score associated therewith that corresponds to the confidence assigned by the object detection neural network 220 in detection of an object. In some systems, each of the bounding boxes (whether overlapping or not) for the modified input images 210 may be rescaled along with rescaling of the modified input images 210 to the original scale corresponding to the input image 205. Thereafter, the system may identify overlapping bounding boxes (rescaled and original) and select a highest score (or filter the lowest score) from the overlapping bounding boxes. According to the techniques described herein, the system selects the highest (or filters one or more of the lowest) confidence scores (and the corresponding bounding boxes/objects) for each modified input image 210 (before any rescaling or removing modifications). As such, the most relevant confidence score per modified input image 210 may be identified before rescaling. In some cases, this may avoid utilizing processing resources for rescaling or removing modifications for a set of bounding boxes, since some may be removed from consideration prior to the rescaling/removing of modifications. For example, when the image manipulation techniques include generating multiple scaled images (as illustrated in FIG. 2), the system may perform NMS thresholding per scaled image, including the original input image 205 and the manipulated input images 210.

The confidence distribution normalization 245 and the NMS thresholding per modification 250 techniques may be used in conjunction or separately. If both techniques are used, the techniques may be performed in either order. After one or both techniques are preformed, the post processing and filtering algorithms 230 may rescale and/or remove modifications from the modified input images 210, such that the bounding boxes (from the modified input images 210 and the input image 205) correspond to the input image as resulting input image 240 with identified objects. Further, in some cases, NMS thresholding may be performed on the resulting image 240 such that objects corresponding to overlapping bounding boxes within the resulting images 240 are selected. Further, the system may consider remaining confidence scores (after NMS thresholding per modification, NMS thresholding in the resulting image 240, and/or confidence score normalization) relative to a threshold to determine whether an object is a detected image. As such, remaining bounding boxes (e.g., bounding box 235) may correspond to an identified object within the original input image 205. In some cases, the bounding boxes and resulting input image 240 may be displayed to a user.

Figure 3:
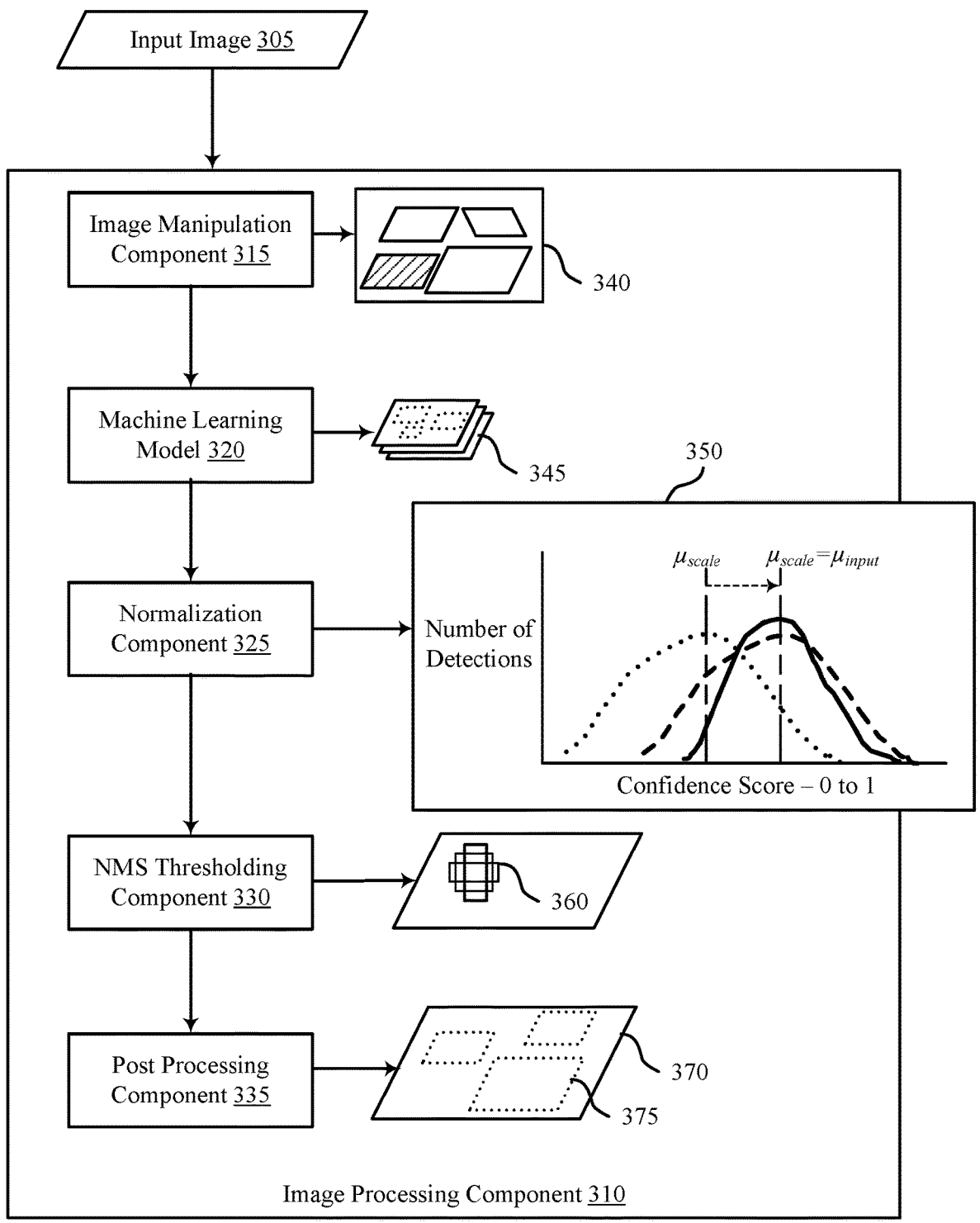
FIG. 3 illustrates an example of an object detection diagram that illustrates image augmentation and object detection in accordance with aspects of the present disclosure.

FIG. 3 illustrates an example of an image identification system 300 that supports image augmentation and object detection in accordance with aspects of the present disclosure. The image identification system 300 may be implemented in various types of computing systems such as personal computers, mobile devices, distributed computing systems, servers, etc. The image identification system 300 receives an input image 305 for object detection (or image classification). In some cases, the input image 305 may be received from a personal computer, from another application executing on the computing system, etc. In some cases, the input image 305 is an image of a document. Further, in some examples, the image processing component 310 may generate the input image based on a received document.

An image manipulation component 315 may receive the input image 305 and manipulate the input image 305 to generate a set of images 340 based on the input image. The set of images may include the input image 305 (unmodified) and one or more modified input images. In some cases, image manipulation includes change the scale of the input image 305, translating the perspective of the input image 305 (e.g., flipping in one or more directions), changing the lighting, introducing noise, etc.

The set of images 340 are passed to the machine learning model 320, which processes each image to identify sets of objects from each image. The machine learning model 320 may utilize deep learning techniques and may be implemented as an image detection neural network. The machine learning model 320 may also generate a range of confidence scores for each image, where each confidence score corresponds to a detected object (and a bounding box for the detected object).

The normalization component 325 may normalize each range of confidence scores corresponding to a modified input image (the second range of confidence scores) according to the range of confidence scores for the input image (the first range of confidence scores). As illustrated by chart 350, the normalization component 325 performs a mean centering technique such that each confidence score for a modified input image is shifted based on the differences between the means for the range of confidence scores for the modified input image and the mean for the range of confidence score corresponding to the input image 305 (unmodified). The normalization component 325 may perform other normalization techniques, including range matching.

The NMS thresholding component 330 may perform NMS thresholding per modified input image 305 (e.g., NMS thresholding per scale). Accordingly, the NMS thresholding component 330 may select the highest (or filter one or more lowest confidence score) from a set of overlapping bounding boxes 360 corresponding to a detected object in each respective image. In some cases, the NMS thresholding component 330 may consider whether the bounding boxes are overlapping to some threshold level before filtering lower confidence scores. Using the NMS thresholding technique, the NMS thresholding component 330 may identify one or more "best" scores for each detected object in a processed image (e.g., the input image 305 and the modified input images). In various examples, the NMS thresholding component 330 performs the NMS thresholding per image before the normalization component 325 normalizes scores. That is, the NMS thresholding and normalization may be performed in any order. Further, the NMS thresholding may be performed without the score normalization, and the normalization may be performed without NMS thresholding. The images are then processed by the post processing component 335, which may perform various post processing techniques such as rescaling images or removing manipulations, comparing confidence scores to a threshold, NMS thresholding within a combined image, etc. In some cases, the post processing component 335 may resize predicted bounding boxes to the size of the input image 305 before performing the NMS thresholding (e.g., if scaling is an image manipulated). In such cases, the NMS thresholding per scale may be performed on the resized images (before the scores are combined after rescaling).

The images may be processed by the confidence thresholding component 355, which may compare remaining confidence scores to a confidence score threshold 380. Confidence scores that satisfy the threshold may be identified as detected objects by post processing component 336. If confidence scores satisfy a threshold, the associated objects may be identified in a resulting image 370 and displayed/identified with bounding boxes (e.g., a bounding box 375). In some examples, the thresholding 380 may be selected as a static confidence score (e.g., above an 85% confidence score). In other cases, the threshold 380 may be dynamic based on the number of detected objects, the range of confidence scores etc. In some cases, the identified objects are input into a document hosted by a document hosting service. The objects may be input using an application programming interface (API) associated with the document hosting service, for example. In one example, the described techniques detect text and/or tables and objects, and the detected text and/or tables are input into a document at the document hosting service.

In some cases, the techniques described herein may be used to train the machine learning model 320. For example, a set of training images may be manipulated by the image manipulation component 315 to generate a set of modified training images. The modified set of training images may be input into the machine learning model 320, the confidence scores normalized according to the confidence scores, and the object detected using the model 320. Each detected object may be identified as being true or false (using a supervised training technique). As such, the model 320 may be better trained to detect various version of objects (e.g., scaled, lightened, darkened, flipped, etc.).

Figure 4:
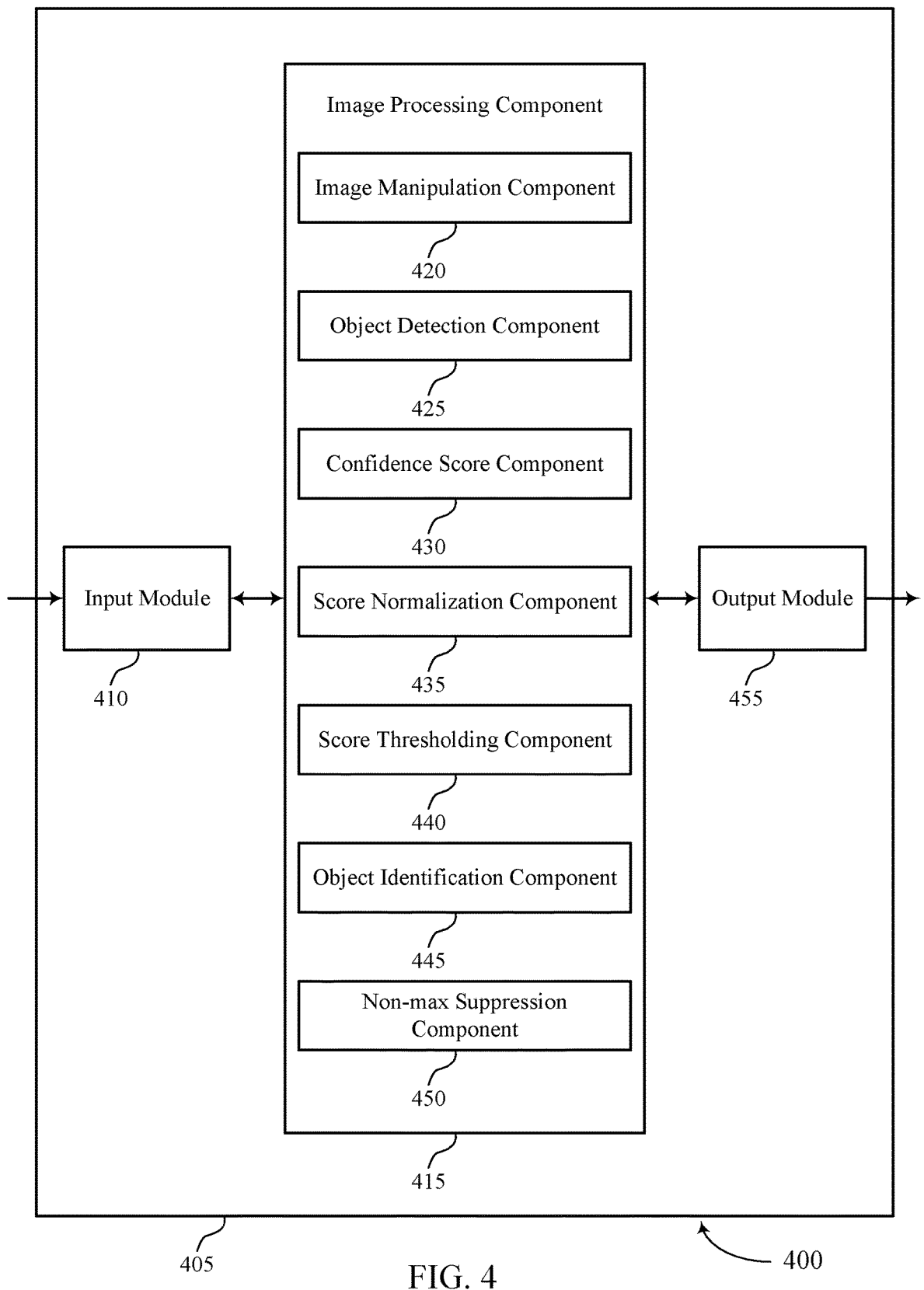
FIG. 4 shows a block diagram of an apparatus that supports image augmentation and object detection in accordance with aspects of the present disclosure.

FIG. 4 shows a block diagram 400 of an apparatus 405 that supports image augmentation and object detection in accordance with aspects of the present disclosure. The apparatus 405 may include an input module 410, an image processing component 415, and an output module 455. The apparatus 405 may also include a processor. Each of these components may be in communication with one another (e.g., via one or more buses). In some cases, the apparatus 405 may be an example of a user terminal, a database server, or a system containing multiple computing devices.

The input module 410 may manage input signals for the apparatus 405. For example, the input module 410 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the apparatus 405 for processing. For example, the input module 410 may transmit input signals to the image processing component 415 to support image augmentation and object detection. In some cases, the input module 410 may be a component of an input/output (I/O) controller 615 as described with reference to FIG. 6.

The image processing component 415 may include an image manipulation component 420, an object detection component 425, a confidence score component 430, a score normalization component 435, a score thresholding component 440, an object identification component 445, and a non-max suppression component 450. The image processing component 415 may be an example of aspects of the image processing component 505 or 610 described with reference to FIGS. 5 and 6.

The image processing component 415 and/or at least some of its various sub-components may be implemented in hardware, software executed by a processor, firmware, or any combination thereof. If implemented in software executed by a processor, the functions of the image processing component 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The image processing component 415 and/or at least some of its various sub-components may be physically located at various positions, including being distributed such that portions of functions are implemented at different physical locations by one or more physical devices. In some examples, the image processing component 415 and/or at least some of its various sub-components may be a separate and distinct component in accordance with various aspects of the present disclosure. In other examples, the image processing component 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The image manipulation component 420 may manipulate an input image to generate at least one modified input image. The image manipulation component 420 may rescale the input image to generate the at least one modified input image comprising a first scaled image and a second scaled image, where the at least two overlapping bounding boxes are identified for each of the first scaled image and the second scaled image and wherein the lower confidence score is filtered from the confidence scores associated with the at least two overlapping boxes corresponding to each of the first scaled image and the second scaled image.

The object detection component 425 may identify, using an object detection machine learning model, the input image and the at least one modified input image, a first set of objects from the input image and at least one second set of objects corresponding to the at least one modified input image.

The confidence score component 430 may generate, using the object detection machine learning model, a first range of confidence scores corresponding to the first set of objects and at least one second range of confidence scores corresponding to the at least one second set of objects.

The score normalization component 435 may normalize the at least one second range of confidence scores according to the first range of confidence scores.

The score thresholding component 440 may identify, from the first range of confidence scores and the normalized at least one second range of confidence scores, a set of confidence scores satisfying a confidence score threshold.

The object identification component 445 may identify, for each confidence score from the set of confidence scores identified as satisfying the confidence score threshold, the corresponding object as a detected object from the input image. The image manipulation component 420 may manipulate an input image to generate at least one modified input image.

The object detection component 425 may identify, using an object detection machine learning model, the input image and the at least one modified input image, a first set of objects from the input image and at least one second set of objects corresponding to the at least one modified input image.

The confidence score component 430 may generate, using the object detection machine learning model, a first range of confidence scores corresponding to the first set of objects and at least one second range of confidence scores corresponding to the at least one second set of objects.

The non-max suppression component 450 may identify at least two overlapping bounding boxes corresponding to objects from the at least one second set of objects corresponding to the at least one modified input image, where the overlapping bounding boxes are associated with a same object and filter, from the at least one second range of confidence scores, a lower confidence score of confidence scores associated with the at least two overlapping bounding boxes.

The score thresholding component 440 may identify, from the first range of confidence scores and the at least one second range of confidence scores, a set of confidence scores satisfying a confidence score threshold. The object identification component 445 may identify, for each confidence score from the set of confidence scores identified as satisfying the confidence score threshold, the corresponding object as a detected object from the input image.

The output module 455 may manage output signals for the apparatus 405. For example, the output module 455 may receive signals from other components of the apparatus 405, such as the image processing component 415, and may transmit these signals to other components or devices. In some specific examples, the output module 455 may transmit output signals for display in a user interface, for storage in a database or data store, for further processing at a server or server cluster, or for any other processes at any number of devices or systems. In some cases, the output module 455 may be a component of an I/O controller 615 as described with reference to FIG. 6.

Figure 5:
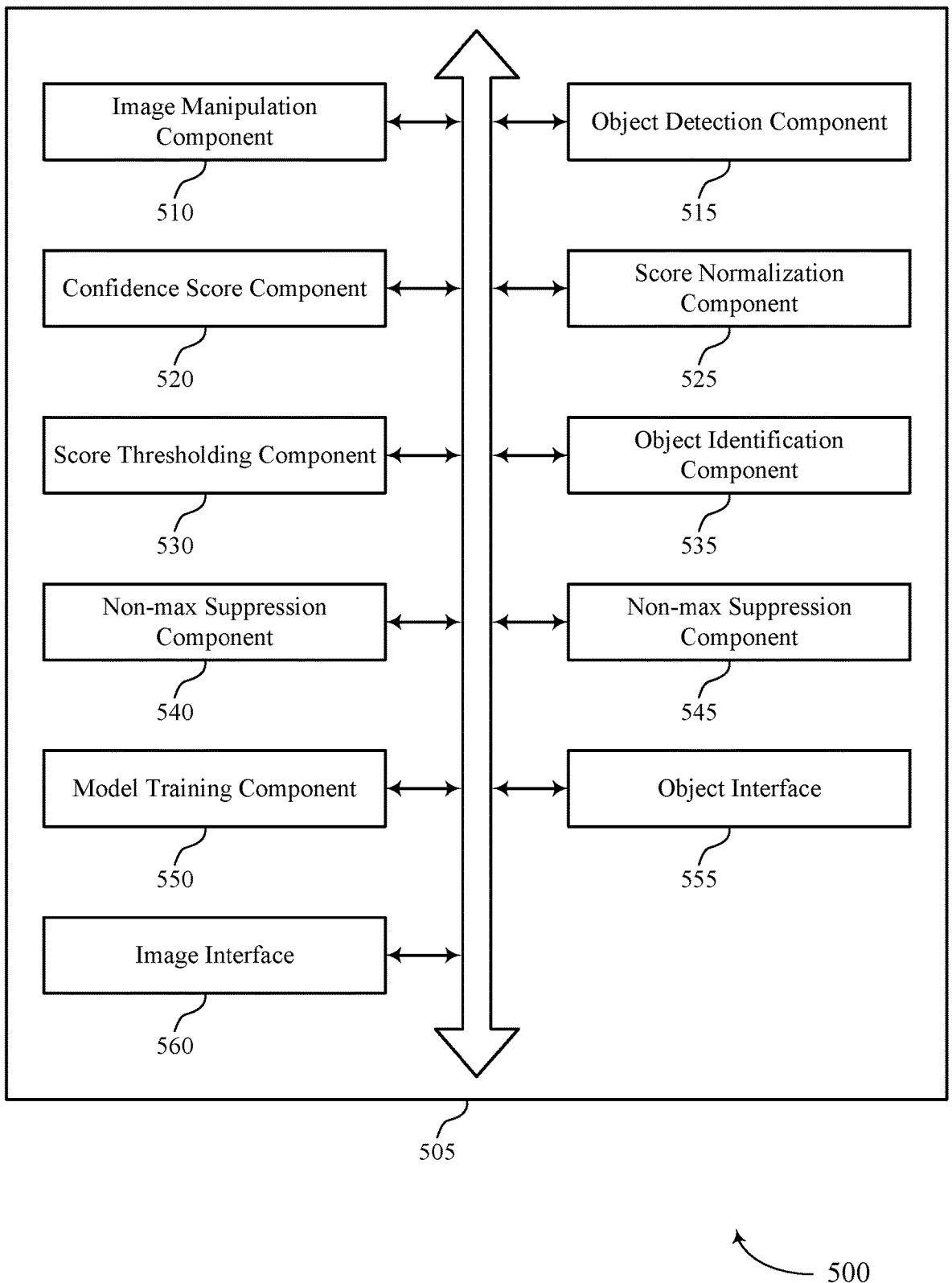
FIG. 5 shows a block diagram of an image processing component that supports image augmentation and object detection in accordance with aspects of the present disclosure.

FIG. 5 shows a block diagram 500 of an image processing component 505 that supports image augmentation and object detection in accordance with aspects of the present disclosure. The image processing component 505 may be an example of aspects of an image processing component 415 or an image processing component 610 described herein. The image processing component 505 may include an image manipulation component 510, an object detection component 515, a confidence score component 520, a score normalization component 525, a score thresholding component 530, an object identification component 535, a non-max suppression component 540, a non-max suppression component 545, a model training component 550, an object interface 555, and an image interface 560. Each of these modules may communicate, directly or indirectly, with one another (e.g., via one or more buses).

The image manipulation component 510 may manipulate an input image to generate at least one modified input image. In some examples, the image manipulation component 510 may manipulate an input image to generate at least one modified input image. In some examples, the image manipulation component 510 may increase a scale of the input image to generate a first modified input image. In some examples, the image manipulation component 510 may decrease the scale of the input image to generate a second modified input image.

In some examples, the image manipulation component 510 may manipulate the input image by modifying a scale of the input image, translating the input image, rotating the input image, adding noise to the input image, modifying a lighting of the input image, transforming a perspective of the input image, or a combination thereof.

In some examples, the image manipulation component 510 may increase a scale of the input image to generate a first modified input image. In some examples, the image manipulation component 510 may decrease the scale of the input image to generate a second modified input image.

In some examples, the image manipulation component 510 may manipulate the input image by modifying a scale of the input image, translating the input image, rotating the input image, adding noise to the input image, modifying a lighting of the input image, transforming a perspective of the input image, or a combination thereof.

In some examples, the image manipulation component 510 may rescale the input image to generate the at least one modified input image comprising a first scaled image and a second scaled image, where the at least two overlapping bounding boxes are identified for each of the first scaled image and the second scaled image and wherein the lower confidence score is filtered from the confidence scores associated with the at least two overlapping boxes corresponding to each of the first scaled image and the second scaled image The object detection component 515 may identify, using an object detection machine learning model, the input image and the at least one modified input image, a first set of objects from the input image and at least one second set of objects corresponding to the at least one modified input image.

In some examples, the object detection component 515 may identify, using an object detection machine learning model, the input image and the at least one modified input image, a first set of objects from the input image and at least one second set of objects corresponding to the at least one modified input image.

In some cases, the object detection machine learning model includes a neural network. In some cases, at least one object from the first set of objects or the at least one second set of objects corresponds to text, a table, or a combination thereof.

In some cases, the object detection machine learning model includes a neural network. The confidence score component 520 may generate, using the object detection machine learning model, a first range of confidence scores corresponding to the first set of objects and at least one second range of confidence scores corresponding to the at least one second set of objects.

In some examples, the confidence score component 520 may generate, using the object detection machine learning model, a first range of confidence scores corresponding to the first set of objects and at least one second range of confidence scores corresponding to the at least one second set of objects.

The score normalization component 525 may normalize the at least one second range of confidence scores according to the first range of confidence scores. In some examples, the score normalization component 525 may determine a first mean of the first range of confidence scores and at least one second mean of the at least one second range of confidence scores.

In some examples, the score normalization component 525 may determine at least one difference between the first mean and the at least one second mean. In some examples, the score normalization component 525 may shift each confidence score of the at least one second range of confidence scores by a corresponding at least one difference. In some examples, the score normalization component 525 may modify the at least one second range of confidence scores based on a variance of the first range of confidence In some examples, the score normalization component 525 may normalize the at least one second range of confidence scores according to the first range of confidence scores. In some examples, the score normalization component 525 may determine a first mean of the first range of confidence scores and at least one second mean of the at least one second range of confidence scores.

In some examples, the score normalization component 525 may determine at least one difference between the first mean and the at least one second mean. In some examples, the score normalization component 525 may shift each confidence score of the at least one second range of confidence scores by a corresponding at least one difference.

In some examples, the score normalization component 525 may modify the at least one second range of confidence scores based on a variance of the first range of confidence scores. The score thresholding component 530 may identify, from the first range of confidence scores and the normalized at least one second range of confidence scores, a set of confidence scores satisfying a confidence score threshold.

In some examples, the score thresholding component 530 may identify, from the first range of confidence scores and the at least one second range of confidence scores, a set of confidence scores satisfying a confidence score threshold. The object identification component 535 may identify, for each confidence score from the set of confidence scores identified as satisfying the confidence score threshold, the corresponding object as a detected object from the input image.

In some examples, the object identification component 535 may identify, for each confidence score from the set of confidence scores identified as satisfying the confidence score threshold, the corresponding object as a detected object from the input image.

The non-max suppression component 545 may identify at least two overlapping bounding boxes corresponding to objects from the at least one second set of objects corresponding to the at least one modified input image, where the overlapping bounding boxes are associated with a same object.

In some examples, the non-max suppression component 545 may filter, from the at least one second range of confidence scores, a lower confidence score of confidence scores associated with the at least two overlapping bounding boxes.

In some examples, the non-max suppression component 545 may filter, from the at least one second range of confidence scores, a lower confidence score of confidence scores associated with the at least two overlapping bounding boxes before identifying the set of confidence scores satisfying the confidence score threshold.

The non-max suppression component 540 may identify at least two overlapping bounding boxes corresponding to objects from the at least one second set of objects corresponding to the at least one modified input image, where the overlapping bounding boxes are associated with a same object. The model training component 550 may manipulate a set of training images to generate at a set of modified training images.

In some examples, the model training component 550 may train the object detection machine learning model on the set of training images and the set of modified training images. In some examples, the model training component 550 may normalize a range of confidence scores corresponding to a set of objects detected from the set of modified training images based on a range of confidence scores corresponding to the set of objects detected from the set of training images.

In some examples, the model training component 550 may manipulate a set of training images to generate at a set of modified training images. In some examples, the model training component 550 may train the object detection machine learning model on the set of training images and the set of modified training images.

In some examples, the model training component 550 may normalize a range of confidence scores corresponding to a set of objects detected from the set of modified training images based on a range of confidence scores corresponding to the set of objects detected from the set of training images.

The object interface 555 may input each detected object from the input image into a document hosted by a document hosting service. In some examples, the object interface 555 may input each detected object from the input image into a document hosted by a document hosting service.

The image interface 560 may receive, from a client device, an image of a document as the input image. In some examples, the image interface 560 may receive, from a client device, an image of a document as the input image. In some cases, at least one object from the first set of objects or the at least one second set of objects corresponds to text, a table, or a combination thereof.

Figure 6:
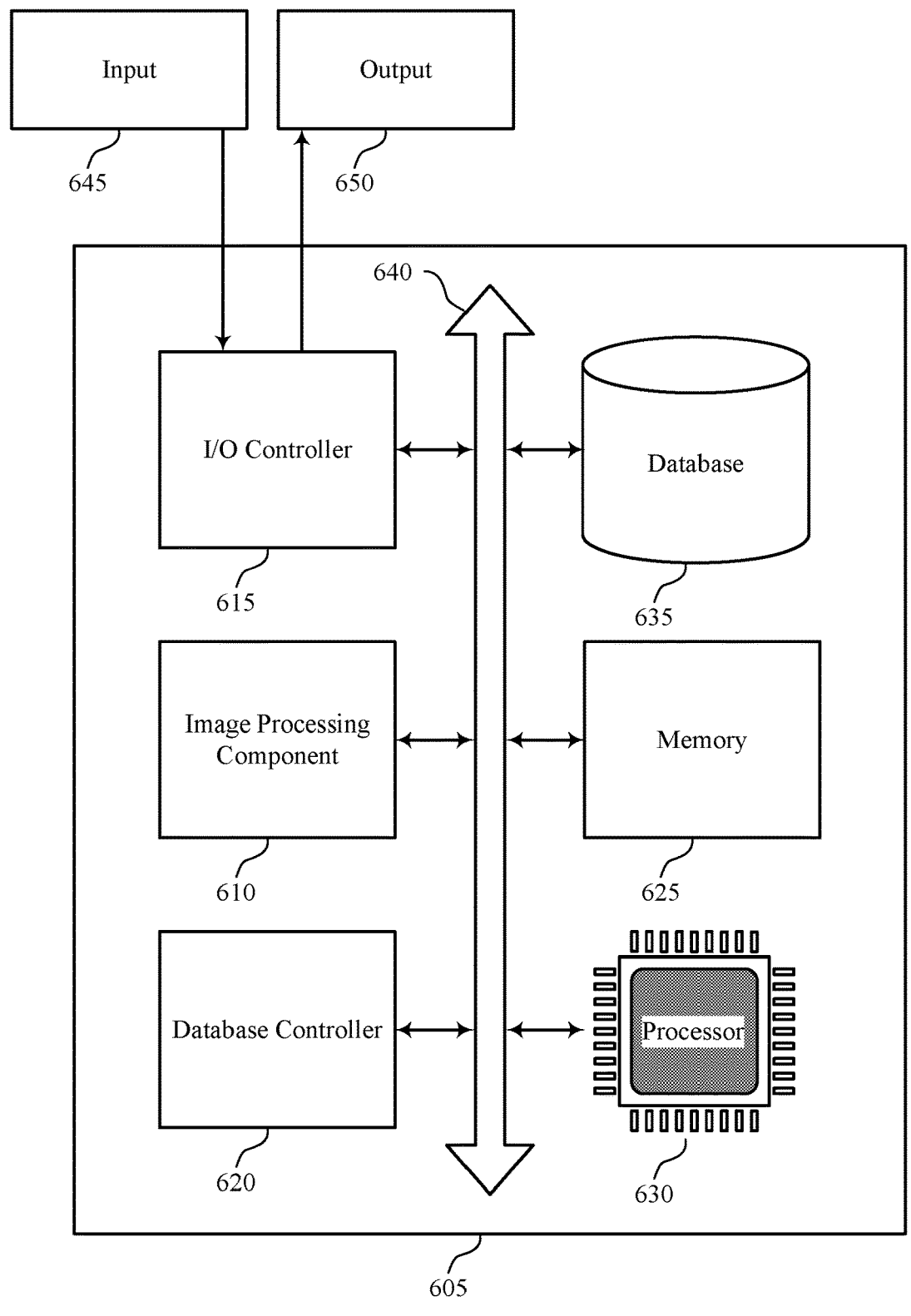
FIG. 6 shows a diagram of a system including a device that supports image augmentation and object detection in accordance with aspects of the present disclosure.

FIG. 6 shows a diagram of a system 600 including a device 605 that supports image augmentation and object detection in accordance with aspects of the present disclosure. The device 605 may be an example of or include the components of a user device, computing device, or an apparatus 405 as described herein. The device 605 may include components for bi-directional data communications including components for transmitting and receiving communications, including an image processing component 610, an I/O controller 615, a database controller 620, memory 625, a processor 630, and a database 635. These components may be in electronic communication via one or more buses (e.g., bus 640).

The image processing component 610 may be an example of an image processing component 415 or 505 as described herein. For example, the image processing component 610 may perform any of the methods or processes described above with reference to FIGS. 4 and 5. In some cases, the image processing component 610 may be implemented in hardware, software executed by a processor, firmware, or any combination thereof.

The I/O controller 615 may manage input signals 645 and output signals 650 for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The database controller 620 may manage data storage and processing in a database 635. In some cases, a user may interact with the database controller 620. In other cases, the database controller 620 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause the processor to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting image augmentation and object detection).

Figure 7:
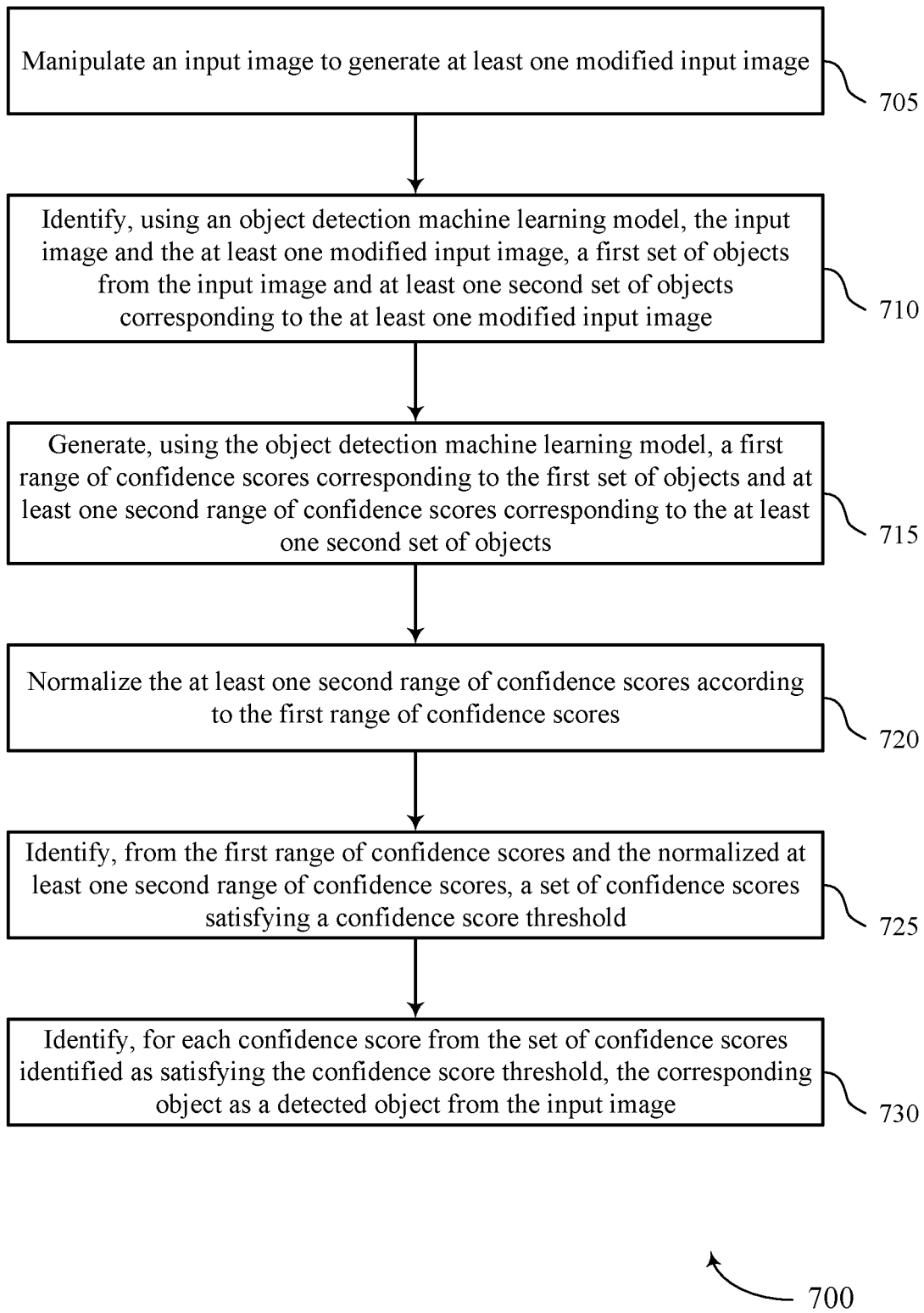
FIGS. 7 through 10 show flowcharts illustrating methods that support image augmentation and object detection in accordance with aspects of the present disclosure.

FIG. 7 shows a flowchart illustrating a method 700 that supports image augmentation and object detection in accordance with aspects of the present disclosure. The operations of method 700 may be implemented by an image detection system or its components as described herein. For example, the operations of method 700 may be performed by an image processing component as described with reference to FIGS. 4 through 6. In some examples, an image detection system may execute a set of instructions to control the functional elements of the image detection system to perform the functions described below. Additionally or alternatively, an image detection system may perform aspects of the functions described below using special-purpose hardware. The image detection system may be implemented in various types of computing systems, such as personal computers (including desktops, laptops, and mobile devices), server computing system hosted locally or in another location, a distributed computing system, etc.

At 705, the image detection system may manipulate an input image to generate at least one modified input image. The operations of 705 may be performed according to the methods described herein. In some examples, aspects of the operations of 705 may be performed by an image manipulation component as described with reference to FIGS. 4 through 6.

At 710, the image detection system may identify, using an object detection machine learning model, the input image and the at least one modified input image, a first set of objects from the input image and at least one second set of objects corresponding to the at least one modified input image. The operations of 710 may be performed according to the methods described herein. In some examples, aspects of the operations of 710 may be performed by an object detection component as described with reference to FIGS. 4 through 6.

At 715, the image detection system may generate, using the object detection machine learning model, a first range of confidence scores corresponding to the first set of objects and at least one second range of confidence scores corresponding to the at least one second set of objects. The operations of 715 may be performed according to the methods described herein. In some examples, aspects of the operations of 715 may be performed by a confidence score component as described with reference to FIGS. 4 through 6.

At 720, the image detection system may normalize the at least one second range of confidence scores according to the first range of confidence scores. The operations of 720 may be performed according to the methods described herein. In some examples, aspects of the operations of 720 may be performed by a score normalization component as described with reference to FIGS. 4 through 6.

At 725, the image detection system may identify, from the first range of confidence scores and the normalized at least one second range of confidence scores, a set of confidence scores satisfying a confidence score threshold. The operations of 725 may be performed according to the methods described herein. In some examples, aspects of the operations of 725 may be performed by a score thresholding component as described with reference to FIGS. 4 through 6.

At 730, the image detection system may identify, for each confidence score from the set of confidence scores identified as satisfying the confidence score threshold, the corresponding object as a detected object from the input image. The operations of 730 may be performed according to the methods described herein. In some examples, aspects of the operations of 730 may be performed by an object identification component as described with reference to FIGS. 4 through 6.

Figure 8:
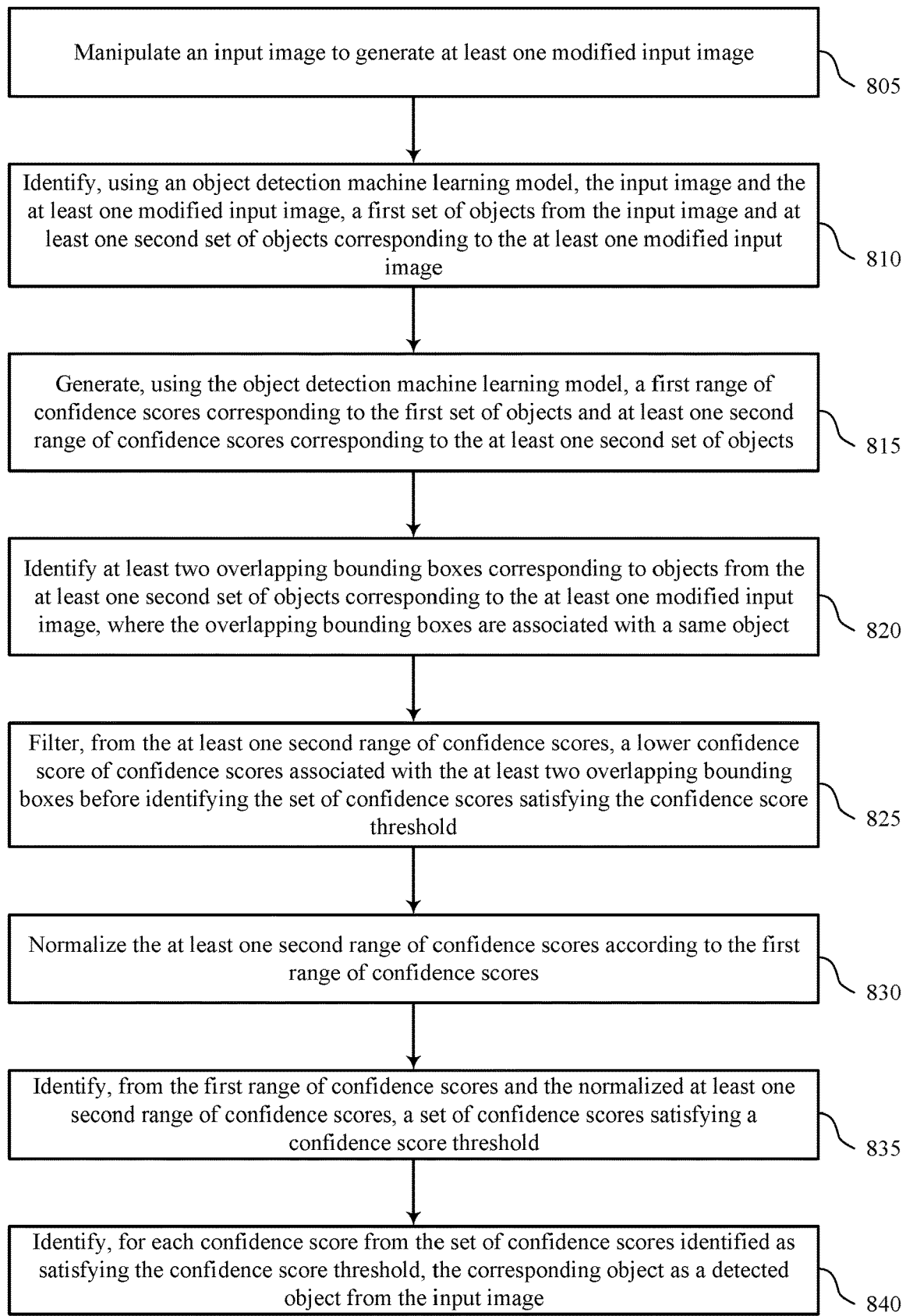

FIG. 8 shows a flowchart illustrating a method 800 that supports image augmentation and object detection in accordance with aspects of the present disclosure. The operations of method 800 may be implemented by an image detection system or its components as described herein. For example, the operations of method 800 may be performed by an image processing component as described with reference to FIGS. 4 through 6. In some examples, an image detection system may execute a set of instructions to control the functional elements of the image detection system to perform the functions described below. Additionally or alternatively, an image detection system may perform aspects of the functions described below using special-purpose hardware.

At 805, the image detection system may manipulate an input image to generate at least one modified input image. The operations of 805 may be performed according to the methods described herein. In some examples, aspects of the operations of 805 may be performed by an image manipulation component as described with reference to FIGS. 4 through 6.

At 810, the image detection system may identify, using an object detection machine learning model, the input image and the at least one modified input image, a first set of objects from the input image and at least one second set of objects corresponding to the at least one modified input image. The operations of 810 may be performed according to the methods described herein. In some examples, aspects of the operations of 810 may be performed by an object detection component as described with reference to FIGS. 4 through 6.

At 815, the image detection system may generate, using the object detection machine learning model, a first range of confidence scores corresponding to the first set of objects and at least one second range of confidence scores corresponding to the at least one second set of objects. The operations of 815 may be performed according to the methods described herein. In some examples, aspects of the operations of 815 may be performed by a confidence score component as described with reference to FIGS. 4 through 6.

At 820, the image detection system may identify at least two overlapping bounding boxes that correspond to a same object of the at least one modified input image. The operations of 820 may be performed according to the methods described herein. In some examples, aspects of the operations of 820 may be performed by a non-max suppression component as described with reference to FIGS. 4 through 6.

At 825, the image detection system may filter, from the at least one second range of confidence scores, a lower confidence score of confidence scores associated with the at least two overlapping bounding boxes before identifying the set of confidence scores satisfying the confidence score threshold. The operations of 825 may be performed according to the methods described herein. In some examples, aspects of the operations of 825 may be performed by a non-max suppression component as described with reference to FIGS. 4 through 6.

At 830, the image detection system may normalize the at least one second range of confidence scores according to the first range of confidence scores. The operations of 830 may be performed according to the methods described herein. In some examples, aspects of the operations of 830 may be performed by a score normalization component as described with reference to FIGS. 4 through 6.

At 835, the image detection system may identify, from the first range of confidence scores and the normalized at least one second range of confidence scores, a set of confidence scores satisfying a confidence score threshold. The operations of 835 may be performed according to the methods described herein. In some examples, aspects of the operations of 835 may be performed by a score thresholding component as described with reference to FIGS. 4 through 6.

At 840, the image detection system may identify, for each confidence score from the set of confidence scores identified as satisfying the confidence score threshold, the corresponding object as a detected object from the input image. The operations of 840 may be performed according to the methods described herein. In some examples, aspects of the operations of 840 may be performed by an object identification component as described with reference to FIGS. 4 through 6.

Figure 9:
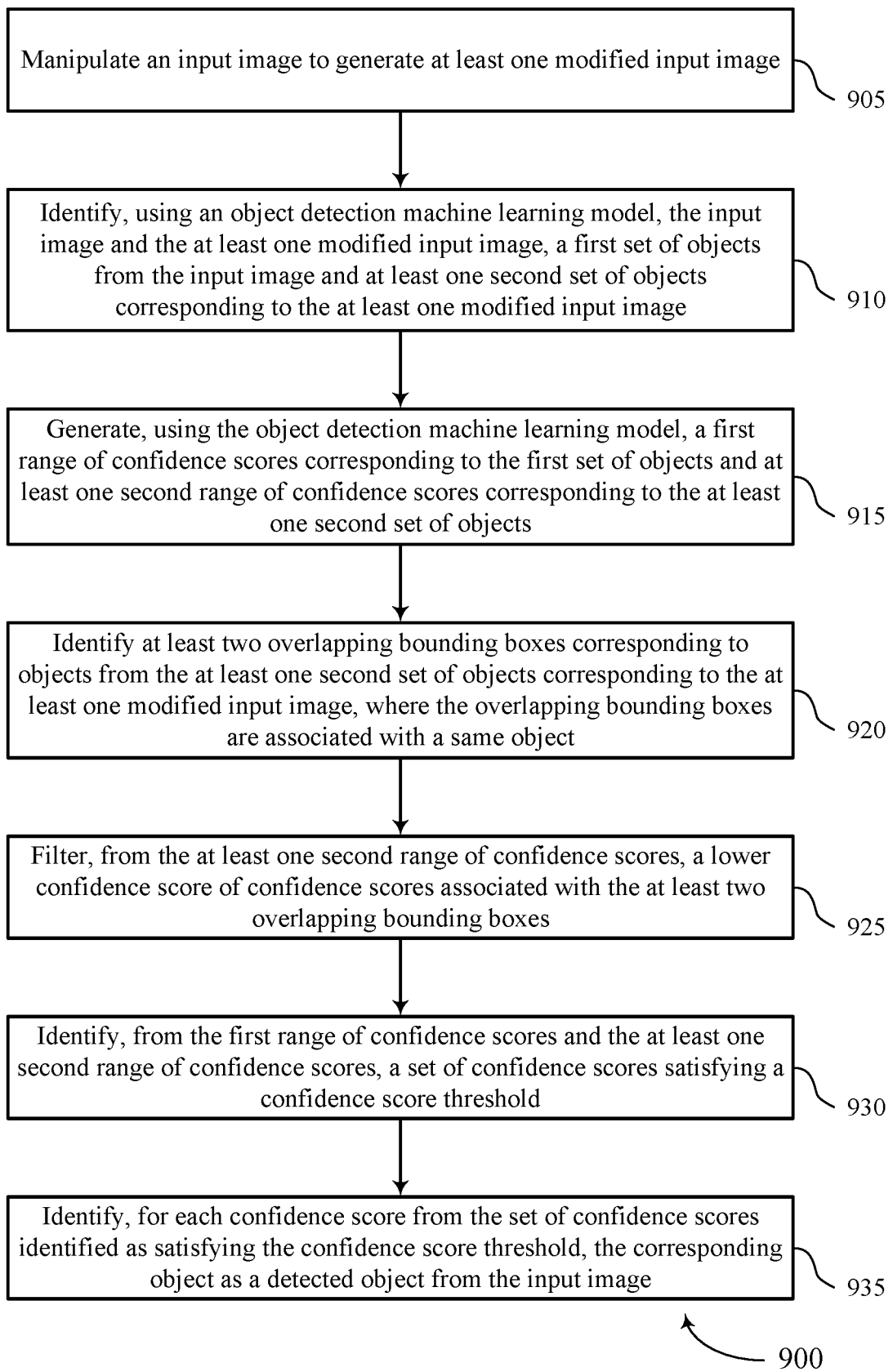

FIG. 9 shows a flowchart illustrating a method 900 that supports image augmentation and object detection in accordance with aspects of the present disclosure. The operations of method 900 may be implemented by an image detection system or its components as described herein. For example, the operations of method 900 may be performed by an image processing component as described with reference to FIGS. 4 through 6. In some examples, an image detection system may execute a set of instructions to control the functional elements of the image detection system to perform the functions described below. Additionally or alternatively, an image detection system may perform aspects of the functions described below using special-purpose hardware.

At 905, the image detection system may manipulate an input image to generate at least one modified input image. The operations of 905 may be performed according to the methods described herein. In some examples, aspects of the operations of 905 may be performed by an image manipulation component as described with reference to FIGS. 4 through 6.

At 910, the image detection system may identify, using an object detection machine learning model, the input image and the at least one modified input image, a first set of objects from the input image and at least one second set of objects corresponding to the at least one modified input image. The operations of 910 may be performed according to the methods described herein. In some examples, aspects of the operations of 910 may be performed by an object detection component as described with reference to FIGS. 4 through 6.

At 915, the image detection system may generate, using the object detection machine learning model, a first range of confidence scores corresponding to the first set of objects and at least one second range of confidence scores corresponding to the at least one second set of objects. The operations of 915 may be performed according to the methods described herein. In some examples, aspects of the operations of 915 may be performed by a confidence score component as described with reference to FIGS. 4 through 6.

At 920, the image detection system may identify at least two overlapping bounding boxes that correspond to a same object of the at least one modified input image. The operations of 920 may be performed according to the methods described herein. In some examples, aspects of the operations of 920 may be performed by a non-max suppression component as described with reference to FIGS. 4 through 6.

At 925, the image detection system may filter, from the at least one second range of confidence scores, a lower confidence score of confidence scores associated with the at least two overlapping bounding boxes. The operations of 925 may be performed according to the methods described herein. In some examples, aspects of the operations of 925 may be performed by a non-max suppression component as described with reference to FIGS. 4 through 6.

At 930, the image detection system may identify, from the first range of confidence scores and the at least one second range of confidence scores, a set of confidence scores satisfying a confidence score threshold. The operations of 930 may be performed according to the methods described herein. In some examples, aspects of the operations of 930 may be performed by a score thresholding component as described with reference to FIGS. 4 through 6.

At 935, the image detection system may identify, for each confidence score from the set of confidence scores identified as satisfying the confidence score threshold, the corresponding object as a detected object from the input image. The operations of 935 may be performed according to the methods described herein. In some examples, aspects of the operations of 935 may be performed by an object identification component as described with reference to FIGS. 4 through 6.

Figure 10:
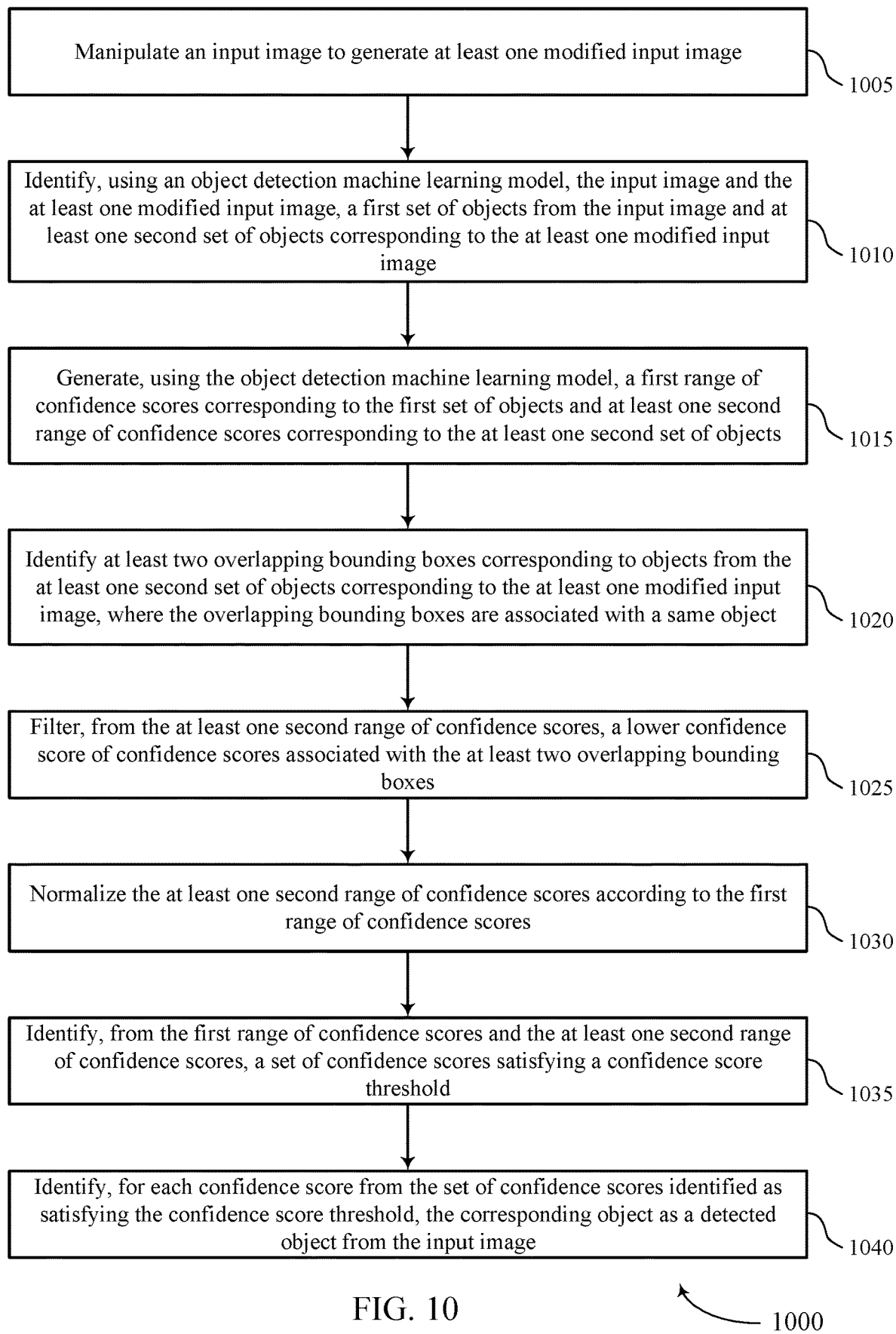

FIG. 10 shows a flowchart illustrating a method 1000 that supports image augmentation and object detection in accordance with aspects of the present disclosure. The operations of method 1000 may be implemented by an image detection system or its components as described herein. For example, the operations of method 1000 may be performed by an image processing component as described with reference to FIGS. 4 through 6. In some examples, an image detection system may execute a set of instructions to control the functional elements of the image detection system to perform the functions described below. Additionally or alternatively, an image detection system may perform aspects of the functions described below using special-purpose hardware.

At 1005, the image detection system may manipulate an input image to generate at least one modified input image. The operations of 1005 may be performed according to the methods described herein. In some examples, aspects of the operations of 1005 may be performed by an image manipulation component as described with reference to FIGS. 4 through 6.

At 1010, the image detection system may identify, using an object detection machine learning model, the input image and the at least one modified input image, a first set of objects from the input image and at least one second set of objects corresponding to the at least one modified input image. The operations of 1010 may be performed according to the methods described herein. In some examples, aspects of the operations of 1010 may be performed by an object detection component as described with reference to FIGS. 4 through 6.

At 1015, the image detection system may generate, using the object detection machine learning model, a first range of confidence scores corresponding to the first set of objects and at least one second range of confidence scores corresponding to the at least one second set of objects. The operations of 1015 may be performed according to the methods described herein. In some examples, aspects of the operations of 1015 may be performed by a confidence score component as described with reference to FIGS. 4 through 6.

At 1020, the image detection system may identify at least two overlapping bounding boxes that correspond to a same object of the at least one modified input image. The operations of 1020 may be performed according to the methods described herein. In some examples, aspects of the operations of 1020 may be performed by a non-max suppression component as described with reference to FIGS. 4 through 6.

At 1025, the image detection system may filter, from the at least one second range of confidence scores, a lower confidence score of confidence scores associated with the at least two overlapping bounding boxes. The operations of 1025 may be performed according to the methods described herein. In some examples, aspects of the operations of 1025 may be performed by a non-max suppression component as described with reference to FIGS. 4 through 6.

At 1030, the image detection system may normalize the at least one second range of confidence scores according to the first range of confidence scores. The operations of 1030 may be performed according to the methods described herein. In some examples, aspects of the operations of 1030 may be performed by a score normalization component as described with reference to FIGS. 4 through 6.

At 1035, the image detection system may identify, from the first range of confidence scores and the at least one second range of confidence scores, a set of confidence scores satisfying a confidence score threshold. The operations of 1035 may be performed according to the methods described herein. In some examples, aspects of the operations of 1035 may be performed by a score thresholding component as described with reference to FIGS. 4 through 6.

At 1040, the image detection system may identify, for each confidence score from the set of confidence scores identified as satisfying the confidence score threshold, the corresponding object as a detected object from the input image. The operations of 1040 may be performed according to the methods described herein. In some examples, aspects of the operations of 1040 may be performed by an object identification component as described with reference to FIGS. 4 through 6.

A method of image processing is described. The method may include manipulating an input image to generate at least one modified input image, identifying, using an object detection machine learning model, the input image and the at least one modified input image, a first set of objects from the input image and at least one second set of objects corresponding to the at least one modified input image, generating, using the object detection machine learning model, a first range of confidence scores corresponding to the first set of objects and at least one second range of confidence scores corresponding to the at least one second set of objects, normalizing the at least one second range of confidence scores according to the first range of confidence scores, identifying, from the first range of confidence scores and the normalized at least one second range of confidence scores, a set of confidence scores satisfying a confidence score threshold, and identifying, for each confidence score from the set of confidence scores identified as satisfying the confidence score threshold, the corresponding object as a detected object from the input image.

An apparatus for image processing is described. The apparatus may include a processor, memory coupled with the processor, and instructions stored in the memory. The instructions may be executable by the processor to cause the apparatus to manipulate an input image to generate at least one modified input image, identify, using an object detection machine learning model, the input image and the at least one modified input image, a first set of objects from the input image and at least one second set of objects corresponding to the at least one modified input image, generate, using the object detection machine learning model, a first range of confidence scores corresponding to the first set of objects and at least one second range of confidence scores corresponding to the at least one second set of objects, normalize the at least one second range of confidence scores according to the first range of confidence scores, identify, from the first range of confidence scores and the normalized at least one second range of confidence scores, a set of confidence scores satisfying a confidence score threshold, and identify, for each confidence score from the set of confidence scores identified as satisfying the confidence score threshold, the corresponding object as a detected object from the input image.

Another apparatus for image processing is described. The apparatus may include means for manipulating an input image to generate at least one modified input image, identifying, using an object detection machine learning model, the input image and the at least one modified input image, a first set of objects from the input image and at least one second set of objects corresponding to the at least one modified input image, generating, using the object detection machine learning model, a first range of confidence scores corresponding to the first set of objects and at least one second range of confidence scores corresponding to the at least one second set of objects, normalizing the at least one second range of confidence scores according to the first range of confidence scores, identifying, from the first range of confidence scores and the normalized at least one second range of confidence scores, a set of confidence scores satisfying a confidence score threshold, and identifying, for each confidence score from the set of confidence scores identified as satisfying the confidence score threshold, the corresponding object as a detected object from the input image.

A non-transitory computer-readable medium storing code for image processing is described. The code may include instructions executable by a processor to manipulate an input image to generate at least one modified input image, identify, using an object detection machine learning model, the input image and the at least one modified input image, a first set of objects from the input image and at least one second set of objects corresponding to the at least one modified input image, generate, using the object detection machine learning model, a first range of confidence scores corresponding to the first set of objects and at least one second range of confidence scores corresponding to the at least one second set of objects, normalize the at least one second range of confidence scores according to the first range of confidence scores, identify, from the first range of confidence scores and the normalized at least one second range of confidence scores, a set of confidence scores satisfying a confidence score threshold, and identify, for each confidence score from the set of confidence scores identified as satisfying the confidence score threshold, the corresponding object as a detected object from the input image.

Some examples of the method, apparatuses, and non-transitory computer-readable medium described herein may further include operations, features, means, or instructions for identifying at least two overlapping bounding boxes corresponding to objects from the at least one second set of objects corresponding to the at least one modified input image, where the overlapping bounding boxes may be associated with a same object, and filtering, from the at least one second range of confidence scores, a lower confidence score of confidence scores associated with the at least two overlapping bounding boxes before identifying the set of confidence scores satisfying the confidence score threshold.

In some examples of the method, apparatuses, and non-transitory computer-readable medium described herein, manipulating the input image may include operations, features, means, or instructions for increasing a scale of the input image to generate a first modified input image, and decreasing the scale of the input image to generate a second modified input image.

In some examples of the method, apparatuses, and non-transitory computer-readable medium described herein, manipulating the input image may include operations, features, means, or instructions for manipulating the input image by modifying a scale of the input image, translating the input image, rotating the input image, adding noise to the input image, modifying a lighting of the input image, transforming a perspective of the input image, or a combination thereof.

In some examples of the method, apparatuses, and non-transitory computer-readable medium described herein, normalizing the at least one second range of confidence scores may include operations, features, means, or instructions for determining a first mean of the first range of confidence scores and at least one second mean of the at least one second range of confidence scores, determining at least one difference between the first mean and the at least one second mean, and shifting each confidence score of the at least one second range of confidence scores by a corresponding at least one difference.

In some examples of the method, apparatuses, and non-transitory computer-readable medium described herein, normalizing the at least one second range of confidence scores may include operations, features, means, or instructions for modifying the at least one second range of confidence scores based on a variance of the first range of confidence scores.

Some examples of the method, apparatuses, and non-transitory computer-readable medium described herein may further include operations, features, means, or instructions for manipulating a set of training images to generate at a set of modified training images, and training the object detection machine learning model on the set of training images and the set of modified training images.

In some examples of the method, apparatuses, and non-transitory computer-readable medium described herein, training the object detection machine learning model may include operations, features, means, or instructions for normalizing a range of confidence scores corresponding to a set of objects detected from the set of modified training images based on a range of confidence scores corresponding to the set of objects detected from the set of training images.

Some examples of the method, apparatuses, and non-transitory computer-readable medium described herein may further include operations, features, means, or instructions for inputting each detected object from the input image into a document hosted by a document hosting service.

Some examples of the method, apparatuses, and non-transitory computer-readable medium described herein may further include operations, features, means, or instructions for receiving, from a client device, an image of a document as the input image.

In some examples of the method, apparatuses, and non-transitory computer-readable medium described herein, at least one object from the first set of objects or the at least one second set of objects corresponds to text, a table, or a combination thereof.

In some examples of the method, apparatuses, and non-transitory computer-readable medium described herein, the object detection machine learning model includes a neural network.

Some examples of the method, apparatuses, and non-transitory computer-readable medium described herein may further include operations, features, means, or instructions for rescaling the input image to generate the at least one modified input image comprising a first scaled image and a second scaled image, where the at least two overlapping bounding boxes are identified for each of the first scaled image and the second scaled image and wherein the lower confidence score is filtered from the confidence scores associated with the at least two overlapping boxes corresponding to each of the first scaled image and the second scaled image.

A method of image processing is described. The method may include manipulating an input image to generate at least one modified input image, identifying, using an object detection machine learning model, the input image and the at least one modified input image, a first set of objects from the input image and at least one second set of objects corresponding to the at least one modified input image, generating, using the object detection machine learning model, a first range of confidence scores corresponding to the first set of objects and at least one second range of confidence scores corresponding to the at least one second set of objects, identifying at least two overlapping bounding boxes corresponding to objects from the at least one second set of objects corresponding to the at least one modified input image, where the overlapping bounding boxes are associated with a same object, filtering, from the at least one second range of confidence scores, a lower confidence score of confidence scores associated with the at least two overlapping bounding boxes, identifying, from the first range of confidence scores and the at least one second range of confidence scores, a set of confidence scores satisfying a confidence score threshold, and identifying, for each confidence score from the set of confidence scores identified as satisfying the confidence score threshold, the corresponding object as a detected object from the input image.

An apparatus for image processing is described. The apparatus may include a processor, memory coupled with the processor, and instructions stored in the memory. The instructions may be executable by the processor to cause the apparatus to manipulate an input image to generate at least one modified input image, identify, using an object detection machine learning model, the input image and the at least one modified input image, a first set of objects from the input image and at least one second set of objects corresponding to the at least one modified input image, generate, using the object detection machine learning model, a first range of confidence scores corresponding to the first set of objects and at least one second range of confidence scores corresponding to the at least one second set of objects, identify at least two overlapping bounding boxes corresponding to objects from the at least one second set of objects corresponding to the at least one modified input image, where the overlapping bounding boxes are associated with a same object, filter, from the at least one second range of confidence scores, a lower confidence score of confidence scores associated with the at least two overlapping bounding boxes, identify, from the first range of confidence scores and the at least one second range of confidence scores, a set of confidence scores satisfying a confidence score threshold, and identify, for each confidence score from the set of confidence scores identified as satisfying the confidence score threshold, the corresponding object as a detected object from the input image.

Another apparatus for image processing is described. The apparatus may include means for manipulating an input image to generate at least one modified input image, identifying, using an object detection machine learning model, the input image and the at least one modified input image, a first set of objects from the input image and at least one second set of objects corresponding to the at least one modified input image, generating, using the object detection machine learning model, a first range of confidence scores corresponding to the first set of objects and at least one second range of confidence scores corresponding to the at least one second set of objects, identifying at least two overlapping bounding boxes corresponding to objects from the at least one second set of objects corresponding to the at least one modified input image, where the overlapping bounding boxes are associated with a same object, filtering, from the at least one second range of confidence scores, a lower confidence score of confidence scores associated with the at least two overlapping bounding boxes, identifying, from the first range of confidence scores and the at least one second range of confidence scores, a set of confidence scores satisfying a confidence score threshold, and identifying, for each confidence score from the set of confidence scores identified as satisfying the confidence score threshold, the corresponding object as a detected object from the input image.

A non-transitory computer-readable medium storing code for image processing is described. The code may include instructions executable by a processor to manipulate an input image to generate at least one modified input image, identify, using an object detection machine learning model, the input image and the at least one modified input image, a first set of objects from the input image and at least one second set of objects corresponding to the at least one modified input image, generate, using the object detection machine learning model, a first range of confidence scores corresponding to the first set of objects and at least one second range of confidence scores corresponding to the at least one second set of objects, identify at least two overlapping bounding boxes corresponding to objects from the at least one second set of objects corresponding to the at least one modified input image, where the overlapping bounding boxes are associated with a same object, filter, from the at least one second range of confidence scores, a lower confidence score of confidence scores associated with the at least two overlapping bounding boxes, identify, from the first range of confidence scores and the at least one second range of confidence scores, a set of confidence scores satisfying a confidence score threshold, and identify, for each confidence score from the set of confidence scores identified as satisfying the confidence score threshold, the corresponding object as a detected object from the input image.

Some examples of the method, apparatuses, and non-transitory computer-readable medium described herein may further include operations, features, means, or instructions for normalizing the at least one second range of confidence scores according to the first range of confidence scores.

In some examples of the method, apparatuses, and non-transitory computer-readable medium described herein, normalizing the at least one second range of confidence scores may include operations, features, means, or instructions for determining a first mean of the first range of confidence scores and at least one second mean of the at least one second range of confidence scores, determining at least one difference between the first mean and the at least one second mean, and shifting each confidence score of the at least one second range of confidence scores by a corresponding at least one difference.

In some examples of the method, apparatuses, and non-transitory computer-readable medium described herein, normalizing the at least one second range of confidence scores may include operations, features, means, or instructions for modifying the at least one second range of confidence scores based on a variance of the first range of confidence scores In some examples of the method, apparatuses, and non-transitory computer-readable medium described herein, manipulating the input image may include operations, features, means, or instructions for increasing a scale of the input image to generate a first modified input image, and decreasing the scale of the input image to generate a second modified input image.

In some examples of the method, apparatuses, and non-transitory computer-readable medium described herein, manipulating the input image may include operations, features, means, or instructions for manipulating the input image by modifying a scale of the input image, translating the input image, rotating the input image, adding noise to the input image, modifying a lighting of the input image, transforming a perspective of the input image, or a combination thereof.

Some examples of the method, apparatuses, and non-transitory computer-readable medium described herein may further include operations, features, means, or instructions for manipulating a set of training images to generate at a set of modified training images, and training the object detection machine learning model on the set of training images and the set of modified training images.

In some examples of the method, apparatuses, and non-transitory computer-readable medium described herein, training the object detection machine learning model may include operations, features, means, or instructions for normalizing a range of confidence scores corresponding to a set of objects detected from the set of modified training images based on a range of confidence scores corresponding to the set of objects detected from the set of training images.

Some examples of the method, apparatuses, and non-transitory computer-readable medium described herein may further include operations, features, means, or instructions for inputting each detected object from the input image into a document hosted by a document hosting service.

Some examples of the method, apparatuses, and non-transitory computer-readable medium described herein may further include operations, features, means, or instructions for receiving, from a client device, an image of a document as the input image.

In some examples of the method, apparatuses, and non-transitory computer-readable medium described herein, at least one object from the first set of objects or the at least one second set of objects corresponds to text, a table, or a combination thereof.

In some examples of the method, apparatuses, and non-transitory computer-readable medium described herein, the object detection machine learning model includes a neural network.

Some examples of the method, apparatuses, and non-transitory computer-readable medium described herein may further include operations, features, means, or instructions for rescaling the input image to generate the at least one modified input image comprising a first scaled image and a second scaled image, where the at least two overlapping bounding boxes are identified for each of the first scaled image and the second scaled image and wherein the lower confidence score is filtered from the confidence scores associated with the at least two overlapping boxes corresponding to each of the first scaled image and the second scaled image.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing, comprising:
   manipulating an input image to generate at least one modified input image;
   identifying, using an object detection machine learning model, the input image and the at least one modified input image, a first set of objects from the input image and at least one second set of objects corresponding to the at least one modified input image;
   generating, using the object detection machine learning model, a first range of confidence scores corresponding to the first set of objects and at least one second range of confidence scores corresponding to the at least one second set of objects;
   normalizing the at least one second range of confidence scores according to the first range of confidence scores;
   identifying, from the first range of confidence scores and the normalized at least one second range of confidence scores, a set of confidence scores satisfying a confidence score threshold; and
   identifying, for each confidence score from the set of confidence scores satisfying the confidence score threshold, the corresponding object as a detected object from the input image.

2. The method of claim 1, further comprising:
   identifying at least two overlapping bounding boxes that correspond to a same object of the at least one modified input image; and
   filtering, from the at least one second range of confidence scores, a lower confidence score of confidence scores associated with the at least two overlapping bounding boxes before identifying the set of confidence scores satisfying the confidence score threshold.

3. The method of claim 1, wherein manipulating the input image comprises: increasing a scale of the input image to generate a first modified input image; and decreasing the scale of the input image to generate a second modified input image.

4. The method of claim 1, wherein manipulating the input image comprises:
   manipulating the input image by modifying a scale of the input image, translating the input image, rotating the input image, adding noise to the input image, modifying a lighting of the input image, transforming a perspective of the input image, or a combination thereof.

5. The method of claim 1, wherein normalizing the at least one second range of confidence scores comprises:
   determining a first mean of the first range of confidence scores and at least one second mean of the at least one second range of confidence scores;
   determining at least one difference between the first mean and the at least one second mean; and
   shifting each confidence score of the at least one second range of confidence scores by a corresponding at least one difference.

6. The method of claim 1, wherein normalizing the at least one second range of confidence scores comprises:
   modifying the at least one second range of confidence scores based at least in part on a variance of the first range of confidence scores.

7. The method of claim 1, further comprising:
   manipulating a set of training images to generate a set of modified training images; and
   training the object detection machine learning model on the set of training images and the set of modified training images.

8. The method of claim 7, wherein training the object detection machine learning model comprises:
   normalizing a range of confidence scores corresponding to a set of objects detected from the set of modified training images based on a range of confidence scores corresponding to the set of objects detected from the set of training images.

9. The method of claim 1, wherein at least one object from the first set of objects or the at least one second set of objects corresponds to text, a table, or a combination thereof.

10. The method of claim 1, wherein the object detection machine learning model comprises a neural network.

11. An apparatus for image processing, comprising:
    a processor;
    memory coupled with the processor; and
    instructions stored in the memory and executable by the processor to cause the apparatus to:
      manipulate an input image to generate at least one modified input image;
      identify, using an object detection machine learning model, the input image and the at least one modified input image, a first set of objects from the input image and at least one second set of objects corresponding to the at least one modified input image;
      generate, used the object detection machine learning model, a first range of confidence scores corresponding to the first set of objects and at least one second range of confidence scores corresponding to the at least one second set of objects;

normalize the at least one second range of confidence scores according to the first range of confidence scores;

identify, from the first range of confidence scores and the normalized at least one second range of confidence scores, a set of confidence scores satisfying a confidence score threshold; and identify, for each confidence score from the set of confidence scores satisfying the confidence score threshold, the corresponding object as a detected object from the input image.

12. The apparatus of claim 11, wherein the instructions are further executable by the processor to cause the apparatus to:

identify at least two overlapping bounding boxes that correspond to a same object of the at least one modified input image; and filter, from the at least one second range of confidence scores, a lower confidence score of confidence scores associated with the at least two overlapping bounding boxes before identifying the set of confidence scores satisfying the confidence score threshold.

13. The apparatus of claim 11, wherein the instructions to manipulate the input image are executable by the processor to cause the apparatus to:

increase a scale of the input image to generate a first modified input image; and decrease the scale of the input image to generate a second modified input image.

14. The apparatus of claim 11, wherein the instructions to manipulate the input image are executable by the processor to cause the apparatus to:

manipulate the input image by modifying a scale of the input image, translating the input image, rotating the input image, adding noise to the input image, modifying a lighting of the input image, transforming a perspective of the input image, or a combination thereof.

15. The apparatus of claim 11, wherein the instructions to normalize the at least one second range of confidence scores are executable by the processor to cause the apparatus to:

determine a first mean of the first range of confidence scores and at least one second mean of the at least one second range of confidence scores;

determine at least one difference between the first mean and the at least one second mean; and shift each confidence score of the at least one second range of confidence scores by a corresponding at least one difference.

16. The apparatus of claim 11, wherein the instructions to normalize the at least one second range of confidence scores are executable by the processor to cause the apparatus to:

modify the at least one second range of confidence scores based at least in part on a variance of the first range of confidence scores.

17. The apparatus of claim 11, wherein the instructions are further executable by the processor to cause the apparatus to:

manipulate a set of training images to generate a set of modified training images; and train the object detection machine learning model on the set of training images and the set of modified training images.

18. The apparatus of claim 17, wherein the instructions to train the object detection machine learning model are executable by the processor to cause the apparatus to:

normalize a range of confidence scores corresponding to a set of objects detected from the set of modified training images based on a range of confidence scores corresponding to the set of objects detected from the set of training images.

19. The apparatus of claim 11, wherein:

at least one object from the first set of objects or the at least one second set of objects corresponds to text, a table, or a combination thereof.

20. A non-transitory computer-readable medium storing code for data processing, the code comprising instructions executable by a processor to:

manipulate an input image to generate at least one modified input image;

identify, using an object detection machine learning model, the input image and the at least one modified input image, a first set of objects from the input image and at least one second set of objects corresponding to the at least one modified input image;

generate, used the object detection machine learning model, a first range of confidence scores corresponding to the first set of objects and at least one second range of confidence scores corresponding to the at least one second set of objects;

normalize the at least one second range of confidence scores according to the first range of confidence scores;

identify, from the first range of confidence scores and the normalized at least one second range of confidence scores, a set of confidence scores satisfying a confidence score threshold; and identify, for each confidence score from the set of confidence scores satisfying the confidence score threshold, the corresponding object as a detected object from the input image.

\* \* \* \* \*